US008923505B2

(12) United States Patent
Mergen (10) Patent No.: US 8,923,505 B2
(45) Date of Patent: Dec. 30, 2014

(54) CALL CENTER WITH RESILIENT CONTEXT (75) Inventor: John-Francis Mergen, Baltimore, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1569 days.

(21) Appl. No.: 11/612,308

(22) Filed: Dec. 18, 2006

(65) Prior Publication Data

US 2008/0144804 A1    Jun. 19, 2008

(51) Int. Cl.
*H04M 3/00* (2006.01)
*H04M 3/51* (2006.01)
*H04M 3/42* (2006.01)

(52) U.S. Cl.
CPC ........ *H04M 3/5166* (2013.01); *H04M 3/42068* (2013.01)
USPC .................................. 379/266.1; 379/265.02

(58) Field of Classification Search
USPC ................. 379/202.01, 265.01, 265.02, 266.1
See application file for complete search history.

(56) References Cited

U.S. PATENT DOCUMENTS

| | | | | |
|---|---|---|---|---|
| 6,016,336 A * | 1/2000 | Hanson | ...................... | 379/88.23 |
| 6,314,089 B1 * | 11/2001 | Szlam et al. | .................. | 370/270 |
| 6,751,297 B2 | 6/2004 | Nelkenbaum | | |
| 6,798,876 B1 * | 9/2004 | Bala | .......................... | 379/265.12 |
| 6,934,381 B1 * | 8/2005 | Klein et al. | .............. | 379/265.09 |
| 7,023,979 B1 | 4/2006 | Wu et al. | | |
| 7,231,034 B1 * | 6/2007 | Rikhy et al. | ............. | 379/265.09 |
| 7,734,032 B1 * | 6/2010 | Kiefhaber et al. | ........ | 379/265.01 |
| 2006/0056612 A1 * | 3/2006 | Ju et al. | ..................... | 379/201.01 |

* cited by examiner

*Primary Examiner* — Sonia Gay (57) ABSTRACT

An automated call center that stores state information for callers. When a caller contacts the call center, an identification is determined for that caller. The caller's number may be used as the identification. A database if checked to determine whether a data record exists for that caller. If so, data record is pulled and a caller asset receives the call along with information in the data record. If this is the caller's first call, or first call after a predetermined time period, the a new data record may be created in the database. The caller may be prompted with a series of menu choices that enable the caller to select a caller asset. The call center may record all entries and inputs by the caller and caller asset in the data record.

20 Claims, 5 Drawing Sheets

CALL CENTER WITH RESILIENT CONTEXT

BACKGROUND INFORMATION

Call centers are frequently used by businesses and other facilities to answer incoming calls and route calls to the appropriate asset, person, department, etc. Call centers reduce overhead by using automated systems to provided caller services wherever human assistance is not required. For example, when a caller dials into a call center, the caller may be prompted with a series of menu choices from which to choose. Choices are often affirmed by pressing a corresponding number button on a telephone key pad, and recently also by speaking the appropriate option.

It is common for call centers to employ queuing systems whereby callers are stacked in a queue on a first-in, first-out basis. Automated systems may be used to collect information from the user, thus speeding up the actual person-to-person contact, typically the most expensive component of a customer/employee interaction for an organization. For example, if a caller dials into their credit card issuer's call center, they are often prompted to enter their credit card number before being able to access other services. In addition to using this credit card number to provide services to the customer— account balances, last payment made, payment due, etc.— when the caller is ultimately connected to a person, that person may be automatically provided with the caller's credit card number or any other supplied information.

A problem with call centers is that because the interaction between the call center and the person calling is often controlled by computer software as well as some human control, it is not uncommon for a caller to become disconnected. Also, a caller may navigate to a point in a menu tree structure of the call center menu that requires the caller to hang up or become disconnected. In some contexts, such as repair persons, installers or other diagnosticians, it may be necessary to make multiple successive calls into a call center that are all related to a single incident, installation, repair. etc. Having to re-input information is wasteful to the caller and may cause unnecessary call center resources to be utilized, and thereby wasteful to the organization that maintains the call center.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The following description is intended to convey a thorough understanding of the embodiments described by providing a number of specific embodiments and details involving systems and methods for providing an intelligent call center with resilient call context. It should be appreciated, however, that the present disclosure is not limited to these specific embodiments and details, which are exemplary only. It is further understood that one possessing ordinary skill in the art, in light of known systems and methods, would appreciate the use of the embodiments of the invention for its intended purposes and benefits in any number of alternative embodiments, depending upon specific design and other needs.

As used herein, the term "call center" will be used to refer to a computer controlled telecommunications hub device that receives incoming phone calls and routes to a particular caller asset based on information from the caller. This may include a single location or a virtual assemblage created via a VPN or closed network. A "caller asset," in the context of this specification and claims may include a particular department, particular type of automated service system, particular call taker, or other service or personnel associated with providing a service or supplying information to a caller. A call center may typically be implemented as a private branch exchange (PBX). A PBX is a telephone communications network comprised of a plurality of interconnected communication nodes and hardware and software configured to route calls, transfer information, and interface with an external communication line. PBXs include private and circuit switched, a hosted/virtual PBX (hosted and circuit switched) or traditional Centrex, an internet protocol (IP) PBX (private and packet switched), or IP Centrex or Hosted/Virtual IP (hosted and packet switched).

It should be appreciated however, that although the specification is described in the context of a telephone-based call center, in various embodiments, the call center may be implemented as one or more webservers that are accessed using an Internet protocol. In such embodiments, a "caller" may access the call center server using a network-based communication device such as a computer, PDA, or other data processing device by accessing a network address associated with the call center. For example, this may be performed with a web browser client, or other interface client program executing on the caller's device. Information such as user inputs, server side operations and states, may be stored in association with the an ID of the caller. The ID may be an identification field input by the caller or may be a information automatically captured by the call senter, such as the caller's IP address. Thus, if the user becomes disconnected or is required to reaccess the call center, instead of just retrieving cookie-type identification from the user's device, the call center may retrieve its own state information related to one or more of that caller's previous interactions.

As used herein, the term "caller identification" will be used to refer to a number sequence, telephone number, Internet protocol (IP) address, letter sequence, words, voice recognition pattern, biometric inputs, or other digitizable data sequence or combinations of any of these, that can be used to uniquely identify a particular caller, relative to other callers.

Figure 1:
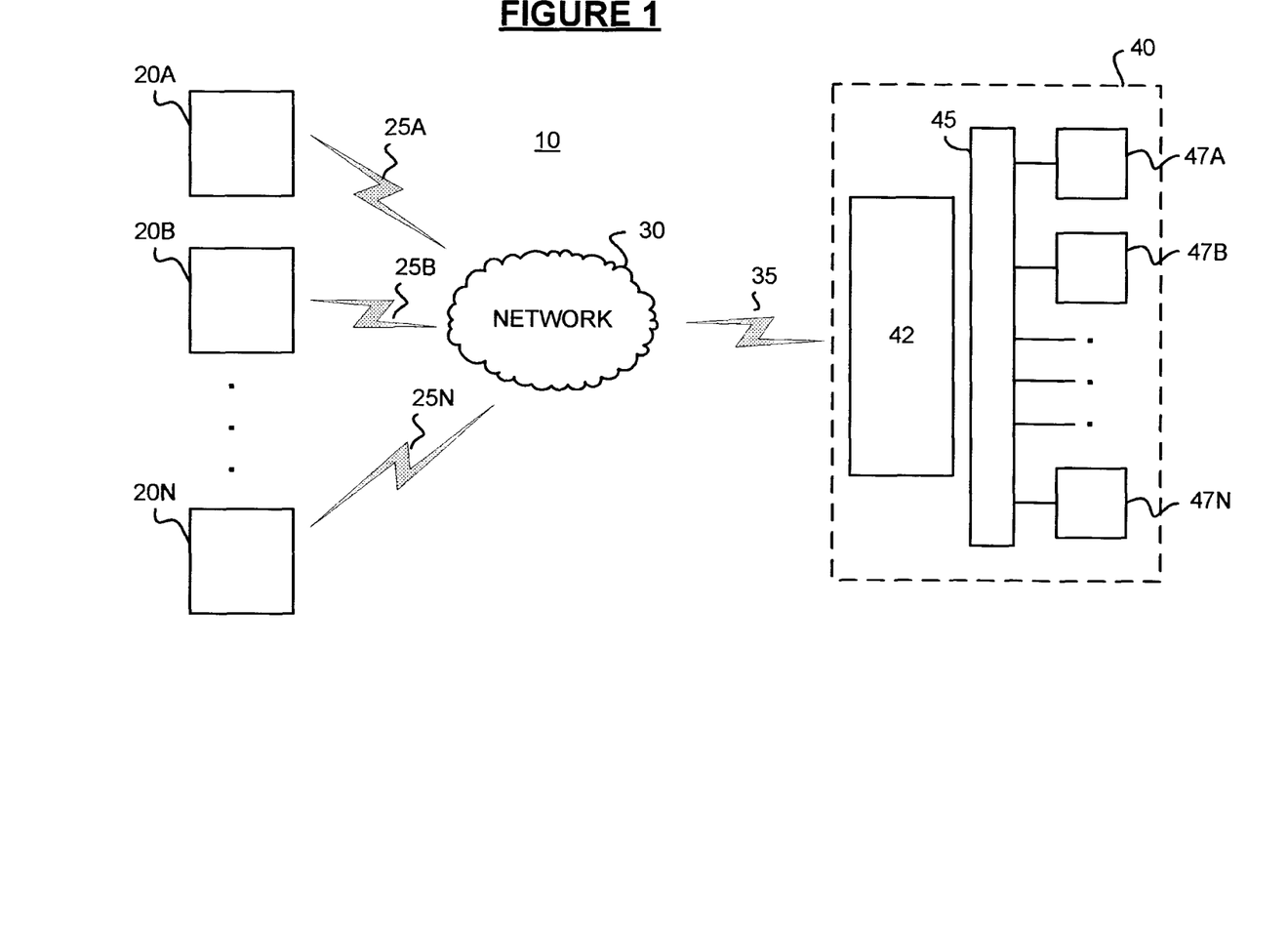
FIG. 1 is a schematic diagram of an intelligent call center in accordance with at least one embodiment of the disclosure.

Referring now to FIG. 1, a schematic diagram of an exemplary intelligent call center system 10 for providing resilient caller context is depicted. The exemplary network-system 10 may include a plurality of devices 20A, 20B, . . . , 20N adapted to communicate over respective network connections 25A, 25B, . . . , 25C with network 30. The devices 20A, 20B, . . . , 20N may comprise cellular telephones, landline telephones, portable computer systems, personal digital assistants, two-way radios, vehicle-based phones, interactive televisions or cable boxes, or other communication devices.

The network connections 25A, 25B, . . . , 25C of FIG. 1 may comprise twisted pair telephone lines, wireless communication links (802.11x, cellular, IrDA, digital subscriber line connections, voice-over-IP connections (VOIP) or other suitable connections. The network 30 may be a wide area digital communication network (WAN) such as the Internet, a public switched telephone network (PSTN), a satellite network, or a network comprising one or more combinations of these network types. A call center 40 may also be communicatively coupled to the network 30 via network connection 35. The network connection 35 may comprise a T1, T3, fiber, trunk line, xDSL line or other suitable network connection.

Figure 5:
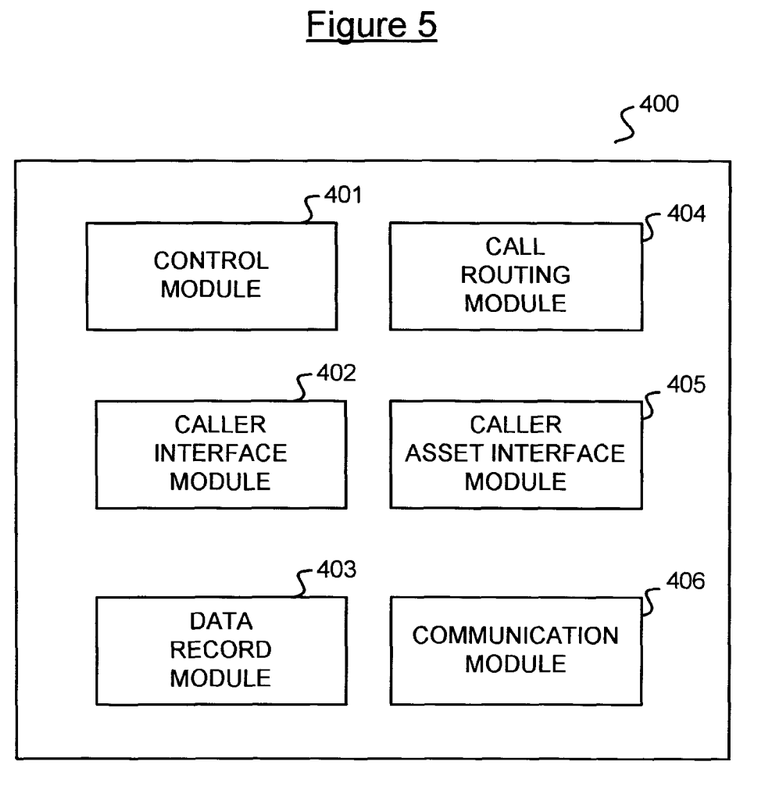
FIG. 5 is a block diagram illustrating exemplary components of an intelligent call center according to at least one embodiment of the disclosure.

The call center 40 may comprise an electronic line interface 42 containing various call center components as discussed in greater detail in the context of FIG. 5, a communications multiplexer 45 and a plurality of caller assets 47A, 47B, . . . , 47N. It should be appreciated that although call center 40 is illustrated in a configuration that implies that the elements are located together, that is in a single device, structure or facility, in various embodiments, the call center 40 components may be geographically distributed. That is one or more of the caller assets 47A, 47B, . . . , 47N may be located in a location remote to the electronic line interface 42. Also, it should be appreciated that the call center may actually be a network of one or more server computer systems and each caller asset may be an automated component or module for facilitating various caller services.

Each call center asset 47A, 47B, . . . , 47N may comprise a person, department, automated service module or other asset. For example, if the call center 40 is associated with a credit card company, each caller asset 47A, 47B, . . . , 47N may comprise a customer service representative. Each caller asset 47A, 47B, . . . , 47N may also comprise one or more automated response modules configured to provide particular types of information—account balance, credit limit increase application, etc.

When a caller interfaces with the call center, either by dialing in, or accessing a network address associated with the call center, and is cut off, or forced out of the tree structure of the call center 40, it may be desirable to be able to retrieve context information for the user's last call in order to save that caller from having to re-supply this information. Thus, in various embodiments, information corresponding to the caller's last call or calls will be stored by the call center 40 in a memory structure. Upon a subsequent call, this information may be available and automatically delivered to a caller asset so that the caller is not required to re-enter or re-communicate this data and/or the purpose of the call, even if the subsequent call is handled by a different caller asset.

In another example, if the call center 40 is associated with a telecommunications company, and the callers are service technicians, each caller asset 47A, 47B, . . . , 47N, may comprise one or more experts, advisors, supervisors, engineers, departments, etc. The technician may have to connect to one caller asset to trouble shoot a line and another to add line services. However, there may be information relevant to both sessions that is common, such as, for example, a customer address/phone number that the technician is currently working on. Thus, in various embodiments, the caller's previous session information may be stored and automatically loaded to the receiving caller asset upon a subsequent access to the call center, whether the caller is unintentionally disconnected or intentionally hangs up or is transferred to another department.

Figure 2:
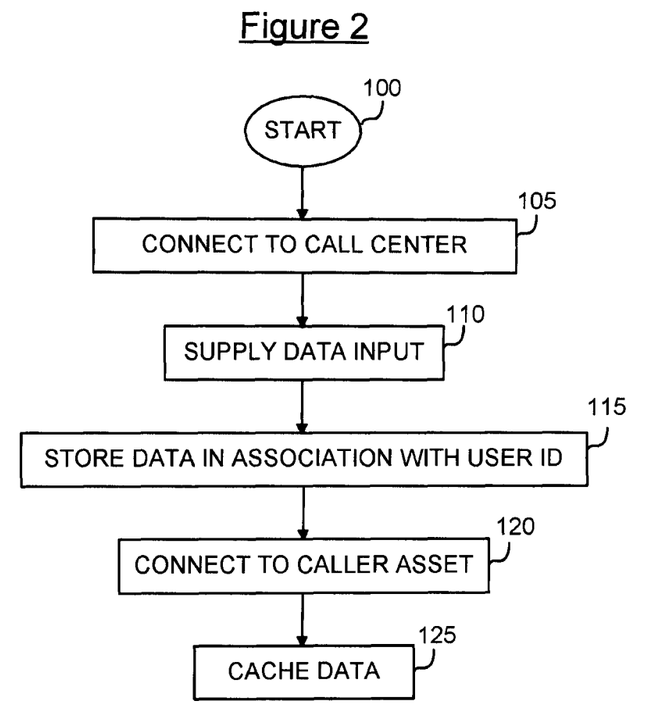
FIG. 2 is a flow chart of an exemplary method for interacting with an intelligent call center in accordance with at least one embodiment of the disclosure.

Referring now to FIG. 2, this Figure is a flow chart of an exemplary method for interacting with an intelligent call center in accordance with at least one embodiment of the disclosure. The method begins in block 100. In block 105, a caller access the call center. This may comprise dialing in to the call center with a telephone or other communication device. This may also comprise dialing in or connecting with a computer or other portable communication device to a network identifier associated with the call center.

In block 110, the caller may supply one or more data inputs to the call center. In various embodiments, when a caller connects, the caller is provided with a menu of choices. This menu may be provided audibly as is known in the art, or may be presented on a screen of a communication device used by the caller. For example, in block 110, the user may input identification information and/or make one or more menu option selections relating to a desired/required service of the caller at the call center. In block 115, the data supplied by the caller may be stored in association with a caller identification. In various embodiments, this may comprise creating a data record based on a caller's phone number or other identification in an automated database.

In block 120, the caller is connected to an appropriate caller asset. This may comprise transferring the caller to a caller asset selected by the user or selected by the call center based on information supplied by the user. For example, if the caller is accessing the call center for the first time, or the first time in a particular time period, (i.e., month, week, day, etc.), a new or updated data record may be created for that caller and a transfer to a particular caller asset may be made based on information supplied by the caller, such as, for example, a menu selection input. Alternatively, if the caller has already accessed the call center in the present time period, that is, if an access record exists for that caller with sufficient temporal proximity to the last access by that caller, a transfer to a caller asset may be made automatically, that is without a caller menu selection, based on information in the caller's data file. Upon identification of the caller, a menu selection offering to make the direct connection may be output to the caller. Alternatively, the caller may be taken to an particular level or asset based on the operations previously performed by the call center for the caller. The caller asset receiving the call may also receive information from the caller's data file automatically to an interface application executing on a call center-based data terminal used by the caller asset. This may be true regardless of whether the caller asset is an automated module or a human representative.

In block 125, data exchanged between the caller and the caller asset may be cached (stored) in a memory structure. This may comprise recording a conversion between a caller and the caller asset, storing information keyed-in by the caller, storing information keyed-in by the caller asset, storing state information corresponding to the caller asset (i.e., any steps, actions, data analysis, etc. performed for the caller by the asset) and combinations of these. In various embodiments, this "cached information" may become part of the caller's data record in the caller database, thereby allowing this information to be automatically loaded upon on a subsequent caller access.

Figure 3:
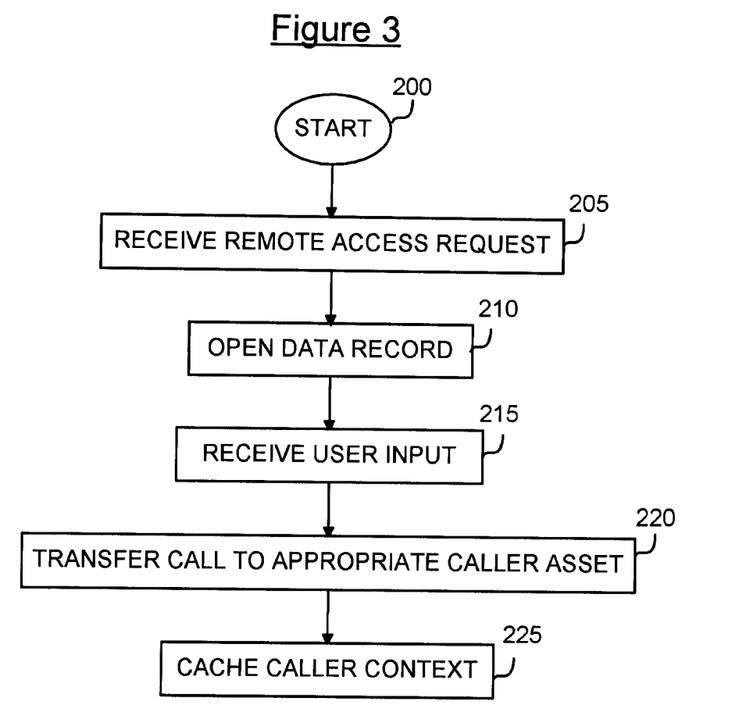
FIG. 3 is a flow chart of an exemplary method for administrating an intelligent call center according to at least one embodiment of the disclosure.

Referring now to FIG. 3, this Figure is a flow chart of an exemplary method for administrating an intelligent call center according to at least one embodiment of the disclosure. The method begins in block 200. In block 205, a remote access request is received. As discussed herein, this may comprise receiving a call from a caller communication device or computing device at the call center. In various embodiments, in block 205, an identification will be determined and associated with the caller, such as the phone number used by the caller or another number supplied by the caller or that is automatically generated at the call center, or alternatively, an IP address, device identification or other unique identifier.

In block 210, a data record may be opened for the caller. This may comprise first checking a database to see if a data record exists for the caller's identification. In some cases even if a data record exists, this may comprise determining if a previous data record entry exists with sufficient temporal proximity to the current caller access. If no data record exists, or no data record entry with sufficient temporal proximity, a new data record may be opened or an existing recorded appended. It should be appreciated that even if a caller is accessing the call center after a period of temporal proximity greater than a predetermined threshold, some information may be loaded from the caller's data file automatically to prevent input of redundant information. For example, information such as a caller's name, address, employee number or other information field that may be common to each caller access may be automatically loaded once the caller's identification is determined.

In block 215, a user input may be received at the call center. This may comprise outputting a menu of choices to a caller and receiving a selection from the menu of choices. For example, an input indicating that the caller has selected one or more caller assets from a list of assets may be received. In block 220, the caller is transferred to an appropriate caller asset. As discussed herein, this may comprise transferring the caller directly or placing the caller in a FIFO queue. This may also comprise creating a new call record that includes any information supplied by the caller prior to being connected to a caller asset and/or any data retrieved from the caller's data file. In block 225, the conversation context between the caller and the caller asset may be cached, that is, recorded. This may comprise storing entries made by the caller, information keyed into a data terminal by the caller asset, recordings of the conversation between the caller and the caller asset, and combinations of these. Alternatively, any actions, services performed or state information regarding the caller's session may be cached by the call center. This cached information may be stored in a database in association with the caller's identification, either at the end of the call or in real time, that is, as it is entered.

Figure 4:
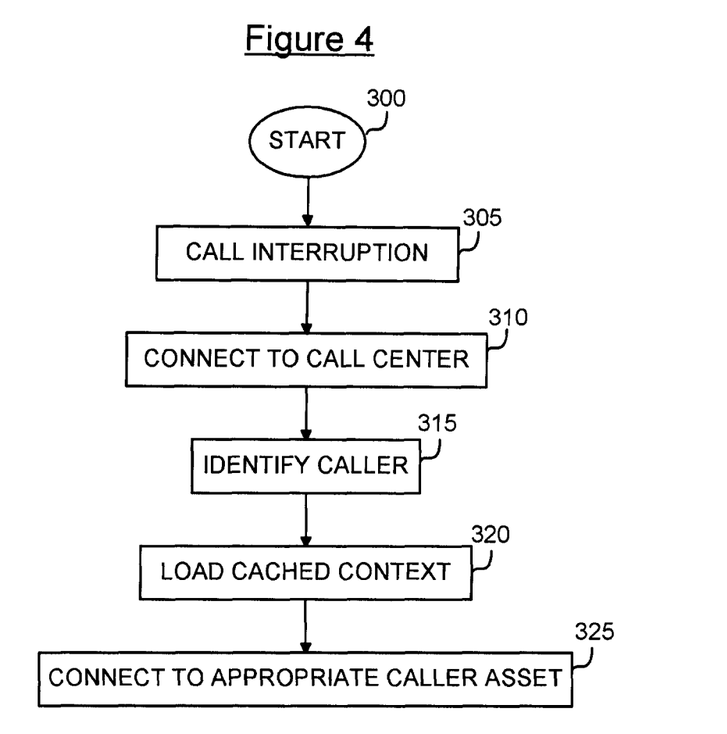
FIG. 4 is a flow chart of an exemplary method for recovering call history information with an intelligent call center according to at least one embodiment of the disclosure.

Referring now to FIG. 4, this is a flow chart of an exemplary method for recovering previous caller information with an intelligent call center according to at least one embodiment of the disclosure. The method begins in block 300. In block 305, an interruption in a call between a caller and the call center occurs. The interruption may be intentional, that is one or more parties may terminate the call, or an communication session maybe terminated by one or both parties or simply "dropped" by the a component of the network connection. Also, the interruption may be unintentional, for example, one or both parties may become disconnected, the user may ends up in a phone tree loop and be forced to hang up, or the nature of the underlying purpose of the session may necessitate multiple successive sessions.

In block 310, the caller may reestablish a connection with the call center. In various embodiments, this may comprise the caller dialing back into a phone number associated with the call center or otherwise accessing a network address associated with the call center. In block 315, the call center may identify the caller. As discussed herein, this may comprise determining a telephone number of the caller or IP address, prompting the user for an identification, or determining another unique identification with which to identify the caller.

In block 320, based on the identification information for the caller, cached context for the caller may be recovered from the caller database. In various embodiments, this database may be indexed by the caller's unique identification. The cached context may comprise data from a previous session between the caller and a caller asset. The cached context may also comprise only data entered by the caller before a caller is transferred to a caller asset, such as, for example, while the caller is waiting in a queue.

In block 325, the caller may be connected to the appropriate caller asset. This may comprise transferring the call, or loading an interface for the caller asset into a browser window or other interface client executing on a caller's device. The particular caller asset may be selected based on information in the cached context. For example, the caller may access the same caller asset as was previously accessed. Also, the caller may be connected to a same category of caller asset, such as a customer service department, technical support department, etc. In various embodiments, the caller may be queued in a waiting queue for the particular caller asset. When the caller is connected to caller asset, the cached context information from the previous call may be loaded into an interface screen of a call center software application executing on a data terminal or other device used by the caller asset. For example, a call center may utilize a software-based call answering system. In such a system, a call center asset may "answer" an incoming call by clicking on a button, link or other control of an interface screen that causes a queued call to be connected to that caller asset. In such a system, any information input by the caller during the call may be cached in association with the caller so that when the caller asset takes the call, this information is provided in a call record screen of the caller asset's computer system. In a web server-based application, the call center asset may be loaded automatically into an screen of an interface client caller interface device.

In the context of the embodiments of the present disclosure, when a caller asset receives a call or is accessed, in addition to information supplied to the call center by the caller in the current caller access session, information from the caller's data file corresponding to previous sessions with the call center may be automatically loaded into a current call record displayed on the caller asset's data terminal, and the caller's subsequent call may be routed to the particular caller asset with that information. In various embodiments, upon subsequent access to the call center and being identified by the caller center, the caller may be presented with an option to continue a previous session. Selecting such an option may cause the caller to be automatically transferred to the previous caller asset or category of caller asset with the cached context information from one or more previous sessions.

FIG. 5 is a block diagram illustrating exemplary components of an intelligent call center 400 according to at least one embodiment of the disclosure. In the example of FIG. 5, the call center 400 comprises a plurality of modules including a control module 401, a caller interface module 402, a data record module 403, a call routing module 404, a caller asset interface module 405, and a communications module 406. It should be appreciated that although in various embodiments, each module may comprise components of a software-based program, each module may also be configured as separate software applications executing on computer hardware, one or more application specific integrated circuits (ASICs), a combination of hardware and software, separate computers or computer components, and/or other suitable configuration(s). Moreover, one or modules may be combined or broken into multiple additional modules. Also, additional and/or different modules than those shown in FIG. 5 may be utilized with various embodiments of the invention.

The control module 401 may comprise one or more central processing units (CPUs), programmable controllers, digital signal processors, embedded microprocessors, application specific integrated circuits, or even a real time kernel of a control and/or operating system of the call center 400.

The caller interface module 402 may comprise one or more application program interfaces (APIs) or a PBX physical communications network interface. The caller interface module 402 may comprise a host programmable interface that allows the host to define a series of possible interactions with incoming callers, as is well known. For example, in a customer service call center for a financial institution, the caller interface module 402 may comprise an interface containing a standard greeting including a menu of choices that allows callers to access various automated and/or manual account services features, such as checking an account balance, transferring funds between accounts, ordering checks, and/or speaking to a customer service representative. The interface module 402 may also comprise a web server or other network-based system accessible by remote communication enabled data processing terminals.

The caller interface module 402 may also comprise hardware and/or software that identifies the caller by some unique identifier. For example, the telephone number, IP address or other information associated with the caller may be captured using standard techniques, and this information may be used to identify the caller to the call center. Also, the caller interface module 402 may be programmed to prompt the caller to enter an identification number, account number, or other sequence of characters that may be used to identify the caller to the call center 400.

In various embodiments, identification may be performed automatically by the caller interface module 402 when the caller access the call center 400, that is, in a manner transparent to the caller. Also, identification may also be performed interactively by prompting the caller for an identification input. In embodiments where identification is performed automatically, the caller interface module may confirm the caller's identification, such as by outputting a message that states, "if this is caller X, press 1, otherwise, press 2," or by presenting a personalized greeting on an interface screen.

In various embodiments, whether caller identification is performed automatically by the caller interface module 402, or through interaction with the caller, the caller interface module 402 may query the data record module 403 to determine if a data record exists for a caller having the current identification. The data record module 403 may comprise a database or other data and/or memory structure that stores caller history information from previous caller sessions. This information may be indexed in the data record module 403 by the caller identification. The caller interface module 402 may query the data record module 403 to determine if a data record exists for the current caller's identification. In various embodiments, this determination may comprise first determining if any data record exist. If not, the caller interface module 402 may create a new data record in the data record module 403 in association with the caller's identification. For example, it may create a data record indexed by the number ###-###-#### along with the date and time of the call. Subsequent information exchange between the caller and call center may also be appended to this record in subsequent sessions.

If the caller interface module 402 determines that a data record does exist for the current caller's identification, the module 402 may further determine if an entry with sufficient temporal proximity to the current time exists. For example, the data record module 403 may store a field, bit or other indicator that stays active for a predetermined time period—i.e., minutes, hours, days, etc. that indicates whether or not the caller has an active call record. Also the data record module 403 may store a time for each appended entry in a caller's data record. The caller interface module 402 may then check the last time entry against the current time to determine if an entry with sufficient temporal proximity to the current time exists.

In various embodiments, the caller interface module 402 may create a current session record in the caller asset interface module 405. The caller interface module 402 may populate this record with information from the data record module 403. This may include only identification information or in the case where a data entry with sufficient temporal proximity is found, this may also include transactional information relating to one or more previous session the call center. As discussed above, if no data record exists for the current caller, the caller interface module 402 may create a new record in the data record module that is indexed by the caller's identification. Information from this new record may be written to the current session record of the caller asset interface module 405.

The call routing module 404 may route incoming calls and/or access requests to particular caller assets. This may comprise placing current access record in one of a plurality of queues, wherein each queue is associated with a particular caller asset. The call routing module 404 may place a current access record in a particular queue based on a caller input received by the caller interface module 402, for example a menu selection made by a caller for a particular caller asset. The queue may correspond to a human caller asset or an automated caller asset.

The caller asset interface module 405 may comprise a server-based and/or centralized software interface for each caller asset data terminal in the case of human caller assets and a machine interface for automated caller assets. Caller assets may access the caller asset interface module 405 via a software application executing on their respective data terminals. The software application may allow the caller assets to view a queue of waiting callers, to "answer" a particular call, and to view a current call record for a caller. In various embodiments, a caller asset may answer a call by clicking on a queued call at the caller asset interface module 405 that is displayed on their data terminal. Answering a call in this manner may cause the caller asset interface module 405 to display a current call record in a display window of the caller asset's data terminal. Also, calls may automatically be transferred by the caller asset interface module 405 when that asset disconnects from a previous call and is therefore available. Alternatively, in web-based applications, "callers" may be automatically routed to a screen, page, or other interface associated with a particular caller asset depending upon whether the asset is an automated response system or a human response system During a call session, a caller asset may key information corresponding to the call into the current call record based on interaction with the caller and/or information supplied by the caller. This may comprise recording the actual conversation between the caller and the caller asset or simply keying-in information. In various embodiments, this information may be appended to the data record in the data record module 403 by the caller asset interface module 405 as discussed herein.

It should be appreciated that the particular modules illustrated in FIG. 5 are exemplary only and should not be construed as either necessary or exhaustive. In various embodiments, it may be desirable to use more, less or even different modules than those illustrated in FIG. 5. Furthermore, the modules may be based on any type of computer programming language including standardized object oriented languages, assembly language, modular programming environments, relational database management systems (RDMSs), and/or proprietary programming languages and environments.

A feature of the various embodiments of the disclosure is that a caller's context information remains resilient between calls for at least a predetermined time period. Thus, when a caller calls into a call center, the call center may automatically load contextual information for the caller based on a previous call and may even automatically route the caller to a particular caller asset based on this stored information. This may save time for the caller and reduce resource expenditure for the call center by reducing the amount of time required to make a call and by routing callers more quickly. This may also improve the caller's satisfaction with the call center, thereby improving customer loyalty to the call center host, that is the organization affiliated with the call center.

In the preceding specification, various preferred embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than a restrictive sense.

The invention claimed is:

1. A system comprising:
an automated communication line interface that accepts calls from a caller;
a data input module that receives one or more inputs from the caller and determines that an existing data record associated with a user identification exists for the caller if the data record associated with the user identification is within a predetermined period of temporal proximity to the call and further determines that no data record associated with the user identification exists if the data record associated with the user is not within the predetermined period of temporal proximity to the call or no data record associated with the user identification is found;
a data storage module that stores the one or more inputs in a stored data record associated with the user identification, wherein the stored data record comprises the existing data record associated with the user identification or a new data record associated with the user identification, based on the determination;
an asset routing module that automatically connects the caller to a particular caller asset such that the stored data record is visible to the caller asset, wherein the asset routing module connects the caller to the particular caller asset based on the stored data record; and
a transaction recording module that appends information exchanged between the caller and the caller asset to the stored data record, wherein the information stored in the stored data record includes at least one or more analytical actions performed by the caller asset, and on a subsequent call by the caller, the caller's stored data record will be automatically supplied to a caller asset receiving the subsequent call.

2. The system according to claim 1, wherein the automated communication line interface, data input module, data storage module, asset routing module and transaction recording modules are components of an intelligent automated call center.

3. The system according to claim 1, wherein the automated communication line interface comprises a menu of caller choices that is output to the caller upon acceptance of the call.

4. The system according to claim 1, wherein the data input module prompts the caller to enter a caller identification number that is used as the user identification by the data storage module.

5. The system according to claim 1, wherein the data input module automatically captures the caller's telephone number and uses this number as the user identification.

6. The system according to claim 1, wherein the data storage module comprises a caller database storing transactional information corresponding to a plurality of callers that is indexed by the caller identification.

7. The system according to claim 1, wherein upon receipt of a call, the data input module accesses the data storage module to determine if an existing data record associated with the user identification or no data record associated with the user identification exists for that caller.

8. The system according to claim 7, wherein the input module that determines the existing data record further loads the existing data record and automatically selects further a caller asset based on information in the existing data record.

9. The system according to claim 8, wherein the asset routing module comprises computer readable program code stored in a non-transitory computer readable storage medium that causes a computer to connect the caller to a particular caller asset and to output the stored data record to a computer interface of the caller asset.

10. The system according to claim 8, wherein the transaction recording module records information input to the computer interface.

11. The system according to claim 1, wherein the asset routing module further connects the caller to a particular caller asset based on data received by the data input module.

12. The system according to claim 1, wherein the asset routing module connects the caller to a particular caller asset based on data associated with the caller in the data storage module.

13. The system according to claim 1, wherein the transaction recording module automatically records information exchanged between the caller and the caller asset to the stored data record.

14. A method comprising:
receiving a session request from a caller at a call center;
identifying the caller with an identification;
determining that an existing data record associated with the caller's identification exists for the caller if the data record associated with a caller's identification is within a predetermined period of temporal proximity to the session request;
determining that no data record associated with the caller's identification exists if the data record is not within a predetermined period of temporal proximity to the session request or no data record associated with the caller's identification is found;
creating a new data record of the caller based on the caller's identification based at least in part on the determination that no data record associated with the caller's identification exists;
outputting a menu of choices to the caller;
storing a selection made by the caller in association with the caller's identification in a stored data record, wherein the stored data record comprises the existing data record associated with the caller's identification or the new data record associated with the caller's identification;
automatically connecting the caller to a caller asset based on the stored data record;
storing information exchanged between the caller and the caller asset in a data file, wherein the information exchanged between the caller and the caller assert includes at least one or more analytical actions performed by the caller asset; and automatically loading the information stored in the data file upon a subsequent session request by the caller.

15. The method according to claim 14, wherein identifying a caller with an identification comprises prompting the caller to input an identification number and using this as the identification.

16. The method according to claim 14, wherein identifying a caller with an identification comprises automatically capturing a number of a caller and using this number as the identification.

17. The method according to claim 14, wherein creating a new data record of the caller based on the caller's identification comprises creating an entry of a caller database comprising call transaction information for a plurality of different callers indexed by the caller identification of each caller.

18. The method according to claim 17, wherein, automatically loading the caller's information from the database further comprising, before creating a new data record, determining that an entry for the caller is in the caller database, and upon such determining, automatically connecting the caller to a caller asset further based on information for that caller in the caller database.

19. The method according to claim 18, wherein automatically connecting the caller to a caller asset comprises outputting the caller's information to a user interface of the caller asset.

20. A method comprising:

receiving a session request from a caller at a call center;

determining an identification of the caller;

searching a caller database based on the caller's identification;

determining that an existing data record associated with the caller's identification exists in the caller database for the caller if the data record associated with a caller's identification is within a predetermined period of temporal proximity to the session request;

determining that no data record associated with the caller's identification exists in the caller database if the data record associated with the caller's identification is not within a predetermined period of temporal proximity to the session request or no data record associated with the caller's identification is found in the caller database;

automatically connecting the caller to a particular caller asset based on the determination of the existing data record or the determination of no data record; and loading the existing data record to a queued current call record based on the determination of the existing data record, wherein the existing data record includes at least one or more analytical actions performed by the caller asset during a previous session within the predetermined period of temporal proximity, otherwise creating a new data record associated with a caller's identification based on the determination of no data record and loading the new data record to a queued current call record.

* * * * *